(12) United States Patent
Arai et al.

(10) Patent No.: US 7,440,578 B2
(45) Date of Patent: Oct. 21, 2008

(54) VEHICLE-MOUNTED THREE DIMENSIONAL SOUND FIELD REPRODUCING SILENCING UNIT

(75) Inventors: Daisuke Arai, Tokyo (JP); Fujio Hayakawa, Tokyo (JP); Toyoaki Kitano, Tokyo (JP); Yutaka Kotani, Tokyo (JP); Yutaka Yamagishi, Tokyo (JP); Masahiro Ieda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 508 days.

(21) Appl. No.: 10/312,853

(22) PCT Filed: May 28, 2001

(86) PCT No.: PCT/JP01/04463

§ 371 (c)(1),
(2), (4) Date: Jan. 2, 2003

(87) PCT Pub. No.: WO02/098171

PCT Pub. Date: Dec. 5, 2002

(65) Prior Publication Data

US 2003/0103636 A1    Jun. 5, 2003

(51) Int. Cl.
*H04R 5/02* (2006.01)
(52) U.S. Cl. .............. 381/302; 381/86; 381/71.4; 381/17; 381/310
(58) Field of Classification Search .......... 381/302, 381/71.4, 86, 310, 71.2, 71.6, 71.8, 1, 17, 381/18
See application file for complete search history.

(56) References Cited

U.S. PATENT DOCUMENTS

| | | | | |
|---|---|---|---|---|
| 4,042,791 A | * | 8/1977 | Wiseman | .............. 381/109 |
| 4,703,502 A | * | 10/1987 | Kasai et al. | .............. 381/302 |
| 4,866,776 A | * | 9/1989 | Kasai et al. | .............. 381/302 |
| 5,068,897 A | * | 11/1991 | Yamato et al. | .............. 381/302 |
| 5,073,944 A | * | 12/1991 | Hirasa | .............. 381/86 |
| 5,426,703 A | * | 6/1995 | Hamabe et al. | .............. 381/71.12 |
| 6,498,856 B1 | * | 12/2002 | Itabashi et al. | .............. 381/302 |
| 6,501,843 B2 | * | 12/2002 | Usui et al. | .............. 381/302 |
| 6,584,202 B1 | * | 6/2003 | Montag et al. | .............. 381/63 |

(Continued)

FOREIGN PATENT DOCUMENTS

JP          59-41158 U          3/1984

(Continued)

*Primary Examiner*—Vivian Chin
*Assistant Examiner*—Jason Kurr
(74) *Attorney, Agent, or Firm*—Birch, Stewart, Kolasch & Birch, LLP (57) ABSTRACT

A vehicle-mounted three dimensional sound signal reproducing•silencing unit includes at least two speakers disposed for each of seats to be occupied by listeners so as to generate a three dimensional sound field space in a region inclusive of left and right external ears of each of the listeners, and three dimensional signal processing means for converting an output signal from a sound source into a three dimensional sound field signal for supplying it to each of the speakers, thereby reproducing a three dimensional sound field with rich presence for each of the seats. The unit also includes antiphase signal generating means for supplying a silencing signal to the three dimensional signal processing means, thereby silencing sounds for each of the seats without giving an effect on the other seats.

2 Claims, 8 Drawing Sheets

U.S. PATENT DOCUMENTS

| | | | |
|---|---|---|---|
| 6,901,147 B1 * | 5/2005 | Enamito et al. | 381/71.4 |
| 2001/0012369 A1 * | 8/2001 | Marquiss | 381/86 |
| 2001/0021257 A1 * | 9/2001 | Ishii | 381/17 |

FOREIGN PATENT DOCUMENTS

| | | |
|---|---|---|
| JP | 62-169593 U | 10/1987 |
| JP | 2-86359 U | 7/1990 |
| JP | 04-126499 | 4/1992 |
| JP | 5-37994 A | 2/1993 |
| JP | 5-344584 A | 12/1993 |
| JP | 7-255099 A | 10/1995 |
| JP | 9-171387 A | 6/1997 |

* cited by examiner

VEHICLE-MOUNTED THREE DIMENSIONAL SOUND FIELD REPRODUCING SILENCING UNIT

This application is the national phase under 35 U.S.C. § 371 of PCT International Application No. PCT/JP01/04463 which has an International filing date of May 28, 2001, which designated the United States of America.

TECHNICAL FIELD

This invention relates to a vehicle-mounted three dimensional sound field reproducing-silencing unit in which speakers are disposed in positions close to a head of listeners inside a vehicle compartment so as to control a sound field reproduced near external ears of the listeners, and which silences a sound for each of the listeners as well as makes the listener enjoyed perceiving a three dimensional sound field with rich presence.

BACKGROUND ART

Figure 1:
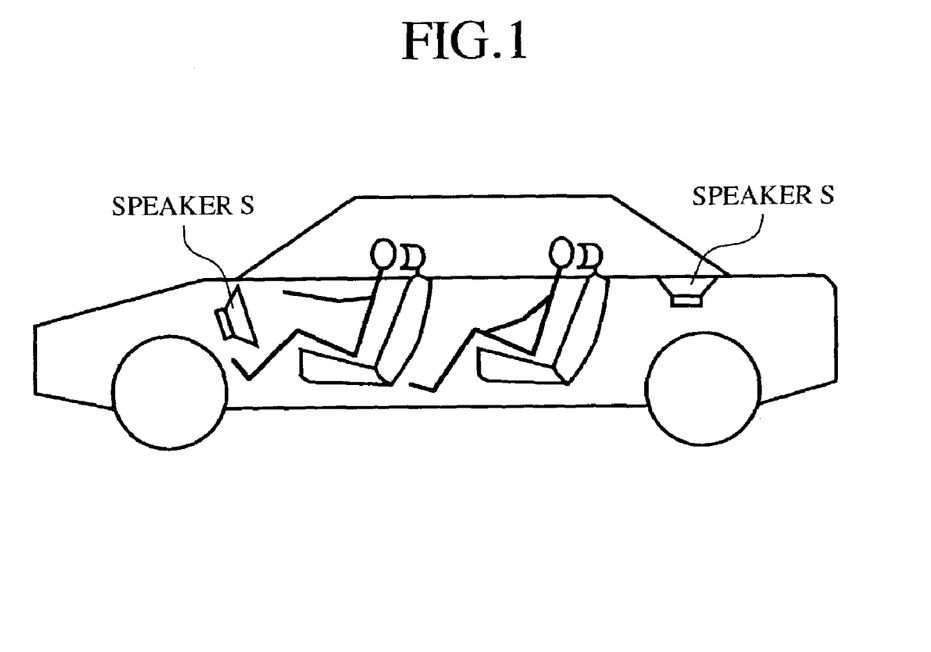
FIG. 1 is a schematic drawing showing a vehicle in which a conventional sound field reproducing unit is mounted.

Conventionally, since a sound is produced by speakers S disposed inside a vehicle compartment as shown in FIG. 1, only a single sound field is reproduced inside the vehicle compartment. As a result, in the case where while a driver is reproducing a music, the other passenger who is occupying seats inside the vehicle is forced to listen to the music against his/her own will. In addition, even if he/she wishes to spend a peaceful time inside the vehicle compartment, his/her wish cannot be fulfilled regretfully.

This invention has been made to solve the above and other problems and has an object of providing a vehicle-mounted three dimensional sound field reproducing silencing unit a) which is capable of selecting and reproducing a desired three dimensional sound field with high accuracy near the external ears of each of the listeners, and b) silencing the sound reproduced near the external ears of each of the listeners.

DISCLOSURE OF INVENTION

A three dimensional sound field reproducing unit according to this invention includes at least two speakers disposed for each of seats to be occupied by listeners so as to produce a three dimensional sound field in a region inclusive of left and right external ears of each of the listeners; and three dimensional signal processing means for converting an output signal from a sound source into a three dimensional sound field signal for supplying it to each of the speakers.

According to this arrangement, it is possible to reproduce a three dimensional sound field with rich presence in the region inclusive of left and right external ears of the listener seated in each of the seats.

In the three dimensional sound field reproducing unit according to this invention the output signal from the sound source is supplied to the three dimensional signal processing means by closing a seating switch to be closed on seating of the listener, and an operation switch to be closed by the listener for selection of the sound source.

According to this arrangement, it is possible to reproduce the sound source for each of the seats.

The three dimensional sound field reproducing unit according to this invention further includes sound source selecting means, disposed on an input side of the three dimensional signal processing means, for selecting desired sound source from a plurality of different sound sources.

According to this arrangement, it is possible for the listeners to select the desired sound source for each of the seats.

In the three dimensional sound field reproducing unit according to this invention the speakers are disposed in each headrest.

According to this arrangement, it is possible to bring the position of the external ears of the listener close to that of the speakers, so that an ideal three dimensional sound field can be realized.

In the three dimensional sound field reproducing unit according to this invention the speakers are disposed on a ceiling so as to surround a head of each of seat-occupying listeners in accordance with left and right external ears of the listener.

According to this arrangement, it is possible to bring the position of the external ears of the listener close to that of the speakers, which realizes not only an ideal three dimensional sound field but also has freedom of speaker disposition.

A three dimensional sound field silencing unit according to this invention includes at least two speakers disposed for each of seats to be occupied by listeners so as to produce a three dimensional sound field space in a region inclusive of left and right external ears of each of the listeners; three dimensional signal processing means for converting an output signal from a sound source into a three dimensional sound field signal for supplying it to each of the speakers; volume detecting means for detecting volume in the three dimensional sound field space; and antiphase signal generating means for supplying a silencing signal that cancels a vehicle noise based on the detected volume from the volume detecting means to the three dimensional signal processing means.

According to this arrangement, a sound can be silenced for each of the seats without giving an effect on other seats.

BEST MODE FOR CARRYING OUT THE INVENTION

In order to explain this invention in more detail, a description will now be made about the best mode for carrying out this invention with reference to the accompanying drawings.

FIRST EMBODIMENT

Figure 2:
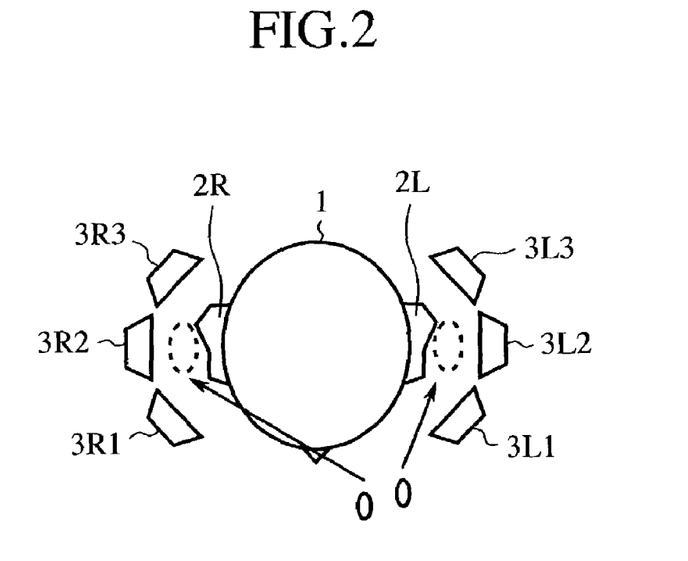
FIG. 2 is a schematic drawing showing an arrangement of speakers for reproducing a three dimensional sound field.

FIG. 2 is a schematic diagram showing an arrangement of speakers in a three dimensional sound field reproducing-silencing unit according to this invention. Three speakers 3L1, 3L2, 3L3 and 3R1, 3R2, 3R3 are respectively disposed near each of both ears 2L, 2R of a listener 1 to control the sound field O reproduced near the external ears.

Figure 3:
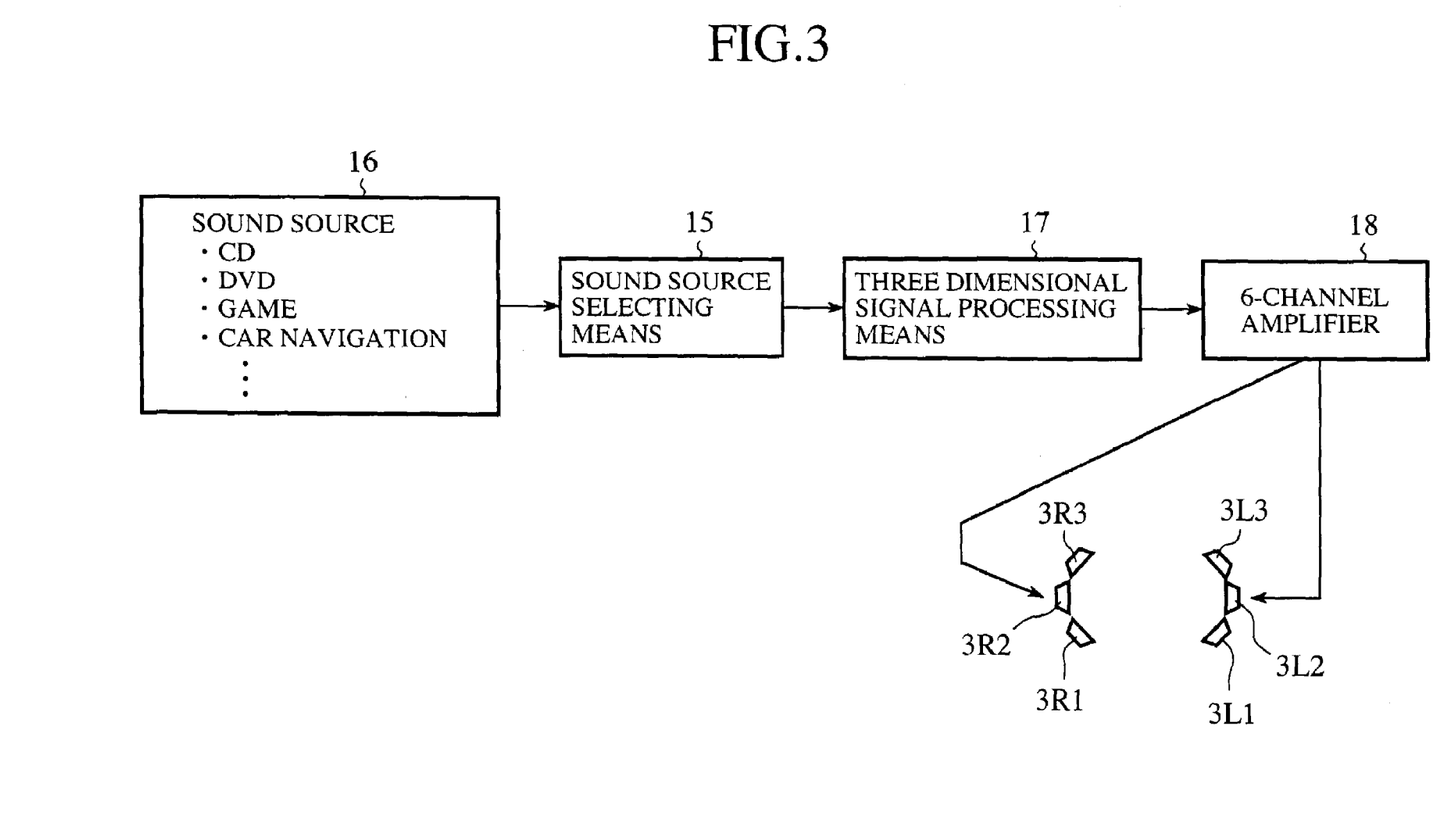
FIG. 3 is a block diagram showing a reproducing circuit to supply a reproducing signal to speakers with an output signal from a sound source as a three dimensional sound field signal.

FIG. 3 shows a reproducing circuit for supplying a reproducing signal to each of the speakers 3L1, 3L2, 3L3 and 3R1, 3R2, 3R3.

Referring to FIG. 3, reference numeral 16 denotes various kinds of sound source, 15 denotes sound source selecting means for switching the output of the sound source 16, 17 denotes three dimensional signal processing means, and 18 denotes a 6-channel (6ch) amplifier for outputting reproducing signals to six speakers.

The sound source 16 includes a 2-channel compact disc (CD), a 5.1-channel digital versatile disk (DVD), an amplitude modulation (AM) and a frequency modulation (FM) sound source, a sound source that has a three dimensional effect for games, a voice guidance for car navigation, or the like.

The three dimensional signal processing means 17 is made up of a digital input unit (not shown), an analog input unit (not shown), an analog/digital (A/D) converter (not shown), a digital signal processing unit (not shown), a digital/analog (D/A) converter (not shown), or the like, and performs a signal processing for converting an output signal from the sound source selecting means 15 into a three dimensional sound field signal.

In FIG. 3, there is shown the case where three speakers 3L1, 3L2, 3L3 and 3R1, 3R2, 3R3 are respectively disposed for each of the left external ear and the right external ear. The reason why this kind of arrangement is preferable is given hereinbelow. In this case, the control points (points in the space intended for reproduction of the state of a target sound wave) lie in three points near the respective external ears.

(1) First Reason

It is possible to produce in the control points the same sound pressure as the original sound field. In order to realize it, there is required a transfer function (an impulse response represented by a time component) from the speakers 3L1, 3L2, 3L3 and 3R1, 3R2, 3R3 to the control points.

The shorter the time of this transfer function becomes, the smaller the scale of the hardware that performs the signal processing becomes. Therefore, the arrangement of the speakers should be selected so as to shorten the time as far as possible. In an ordinary room or in a vehicle compartment, it might be said that the shorter the distance between the speakers and the control points becomes, the shorter the time of the transfer function becomes.

It is because that the more the speakers and the control points away from each other, the larger the ratio of reflected sound becomes arrived at the control points from all directions of the room or the vehicle compartment as compared with the direct sound directly arrived at the control points from the speakers. Conversely, in the case where the distance between the speakers and the control points is small, there will increase the ratio of the direct sound directly arrived at the control points from the speakers as compared with the reflected sound inside the room. The amplitudes of the transfer function will thus be dominated for the most part by the direct sound, and the amplitude components of the reflected sound are extremely small as compared with the direct sound. Therefore, the time of the transfer function can be regarded to be the time required for convergence of the direct sound.

(2) Second Reason

As a head of the listener is being positioned between the speakers disposed on the left and right sides, it makes the speakers possible to bring close to the neighborhood of the external ears, which reduces the ratio of crosstalk between both the ears. That is, the closer the right speakers are brought to the right ear, the larger the ratio becomes between the sound directly came into the right ear from the right speakers to those leaked to the opposite left ear, thus decreasing crosstalk.

If the amount of the left and right crosstalk is small, it becomes possible to independently perform a signal processing of the left and right sound fields in controlling the sound field o reproduced near the external ears. The biggest merit thereof is in that the amount of computation is reduced to ½. The signal processing to be performed in the three dimensional sound field reproducing unit is proportional to the product of the number of the speakers and that of the control points.

Now, suppose that the number of the speakers is respectively N in the left and the right and that of the control points is also respectively N in the left and the right. In the case where the amount of crosstalk is small and the left and right signal processing can be independently performed, the amount of computation is N×N per one ear and 2×(N×N) for left and right ears. On the other hand, in the case where the amount of crosstalk is large, since it has to process the left and right signals together, the amount of computation comes to 2N×2N, i.e., 4×(N×N). In the case where there is no crosstalk, the amount of computation goes down to ½.

The vehicle-mounted three dimensional sound field reproducing unit of this invention does not necessarily coerce the number of the speakers in the left and right to be limited to three. Theoretically, since the control points increase in accordance with the number of the speakers, the larger the number of the speakers becomes, the more the original sound field is accurately simulated. However, since the amount of signal processing is proportional to the second power of the number of the speakers, the unit having an unreasonably large number of speakers is not practical when the number of the channels and the capacity of computation processing in an ordinary audio device are considered.

On the contrary, when considered from the viewpoint of simulation accuracy, disposing one speaker on the left and right sides respectively shows little or no difference from the conventional headphone system. Therefore, the reasonable selection will therefore be at least two speakers for each ear. This technique of using two speakers for each ear is, however, insufficient in accuracy because the sound field can only be reproduced along the line connecting the two control points.

Then, in the case where three speakers are used for each ear, the sound field can be reproduced within the region of a triangle formed by connecting the three control points. In this case, it is possible to reproduce even the travelling direction of the sound waves within the region by reproducing the sound pressure at the control points. In order to perceive the three dimensional (three-dimensional) sound field, it is highly important that the travelling direction of the sound waves is reproduced. Considering the direction of propagation of the sound waves, the number of the speakers with which one expects to reproduce the sound field with high accuracy and which does not amount to a large scale for practical use will be three in the left and right respectively, i.e., six in total.

Figure 4:
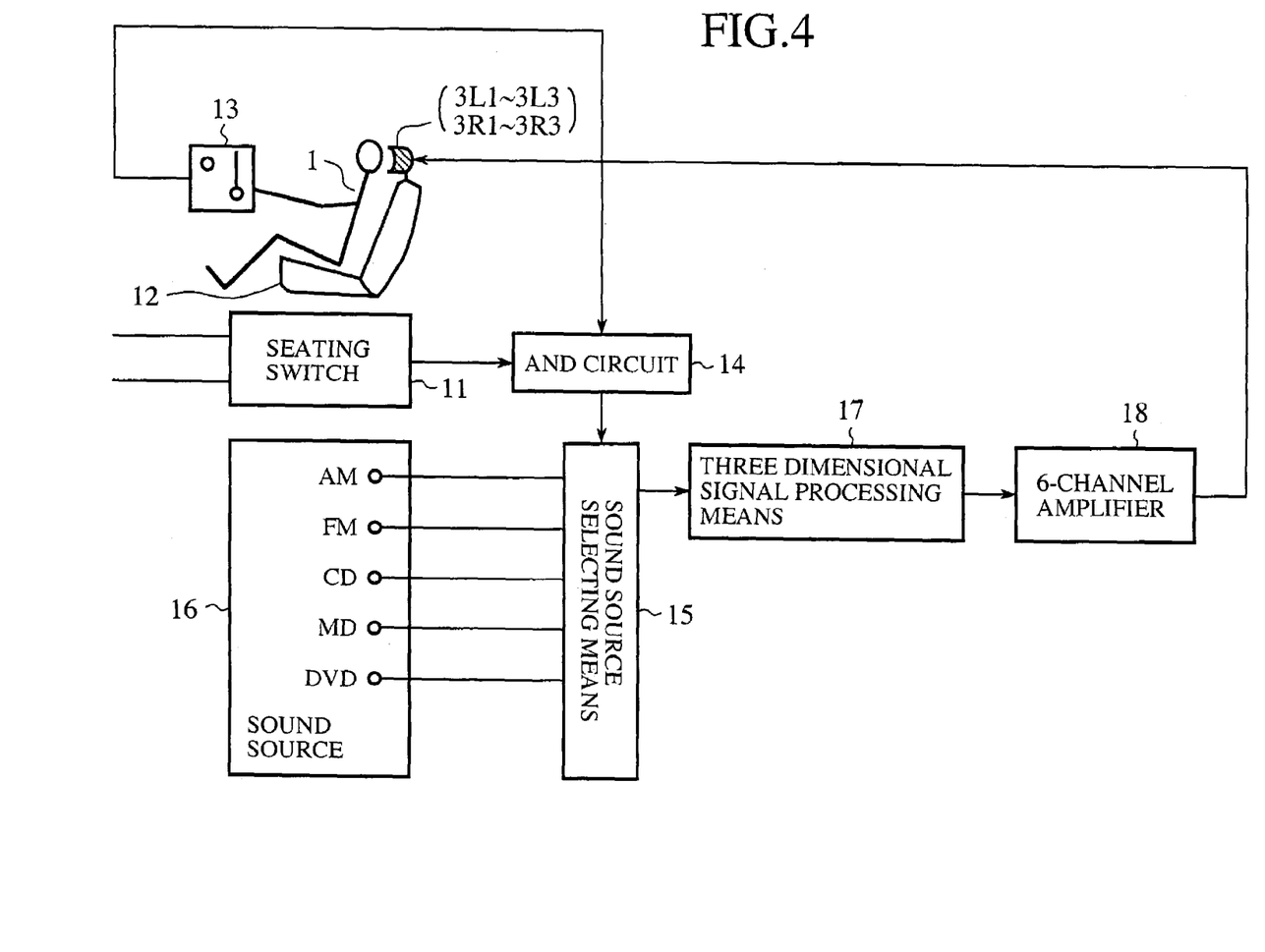
FIG. 4 is a block diagram showing a state in which speakers are mounted on a headrest, which generates a three dimensional sound field reproducing space in a region inclusive of left and right external ears of a listener for each of seats to be occupied by the listener.

FIG. 4 is a schematic diagram in which a vehicle-mounted three dimensional sound field reproducing unit according to this invention based on the above-described principle is disposed in a headrest 20 in each of the seats inside a motor vehicle.

Referring to FIG. 4, reference numeral 11 denotes a seating switch disposed under a seat 12, 13 denotes an operation switch provided for each seat so that the listener himself/ herself can switch it on and off, 14 denotes an AND circuit to find the logical product of the seating switch 11 and the operation switch 13, 15 denotes sound source selecting means for selecting the sound source 16 such as the AM broadcasting, the FM broadcasting, the CD, the MD, the DVD, or the like, 17 denotes three dimensional signal processing means for performing a signal processing depending on the sound source 16 and for outputting analog signals equal to the number of the speakers (a 6-channel in FIG. 4), and 18 denotes a 6-channel amplifier for amplifying the output of the three dimensional signal processing means 17.

Figure 5:
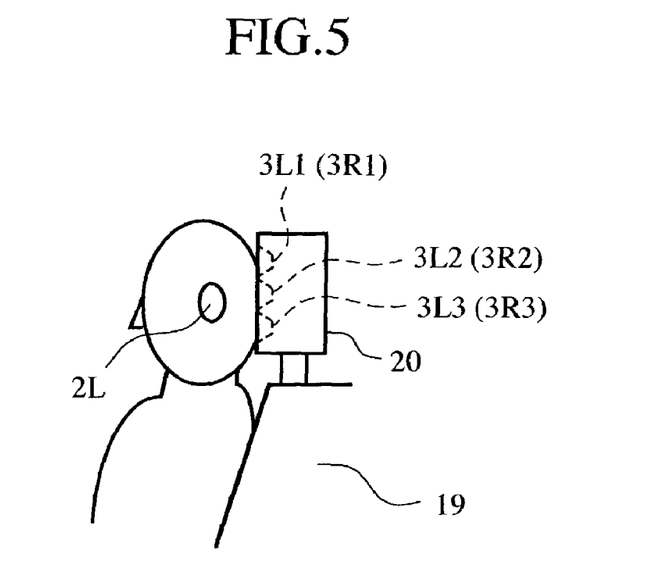
FIG. 5 is an enlarged view of the headrest.
Figure 6:
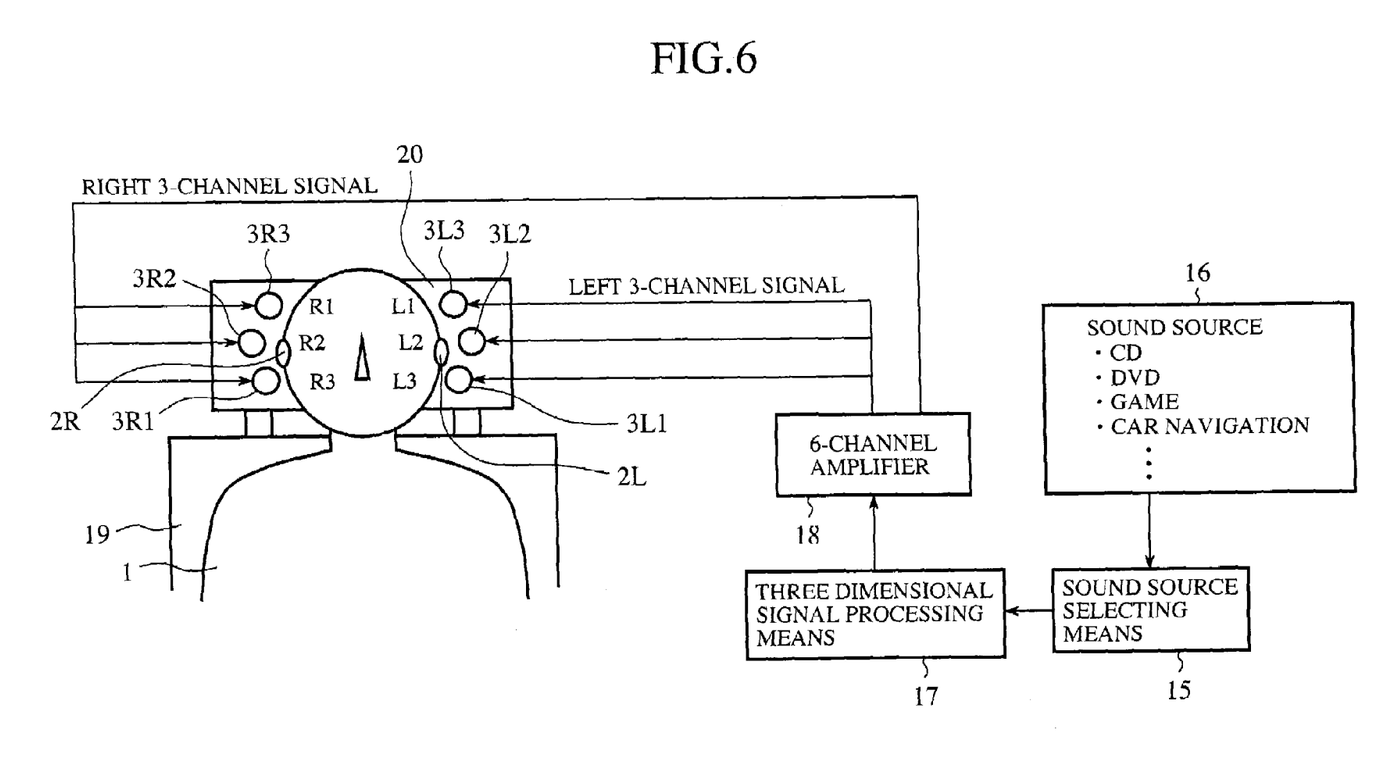
FIG. 6 is a front view of the headrest.

FIG. 5 is a side view in which speakers 3L1, 3L2, 3L3 and 3R1, 3R2, 3R3 are disposed on the headrest 20 placed on an upper surface of a backrest 19, and FIG. 6 is a front view of FIG. 5. In FIGS. 5 and 6, the signal outputted from the sound source 16 is selected by the sound source selecting means 15, subjected to signal processing by the three dimensional signal processing means 17 depending on the sound source 16, and outputs an analog signal equal to the number of speakers (a 6-channel in FIG. 4).

The signal outputted from the three dimensional signal processing means 17 is amplified by the 6-channel amplifier 18 to the level required for listening to the sounds, and is inputted into the six speakers 3L1, 3L2, 3L3 and 3R1, 3R2, 3R3 built into the headrest 20. The speakers 3L1, 3L2, 3L3 and 3R1, 3R2, 3R3 are disposed left and right respectively while surrounding the head of the listener 1. The speakers 3L1, 3L2, 3L3 generate the sound field near the left ear of the listener 1 and the speakers 3R1, 3R2, 3R3 do the sound field near the right ear thereof.

The operation of the vehicle-mounted three dimensional sound field reproducing unit will now be described.

When the listener 1 sits down in the seat, the seating switch 11 is switched on. If the listener 1 switches on the operation switch 13 in this state to select the sound source, the AND circuit 14 outputs the logical product, so that the sound source selecting means 15 is started. Then, the sound source 16 selected by the sound source selecting means 15 is converted by the three dimensional signal processing means 17 into an analog signal equal to the number of the speakers and supplied to the respective speakers after the volume thereof is adjusted by the 6-channel amplifier 18. As a result, a reproducing space 21 of the three dimensional sound field is generated near the external ears of the listener 1.

Figure 7:
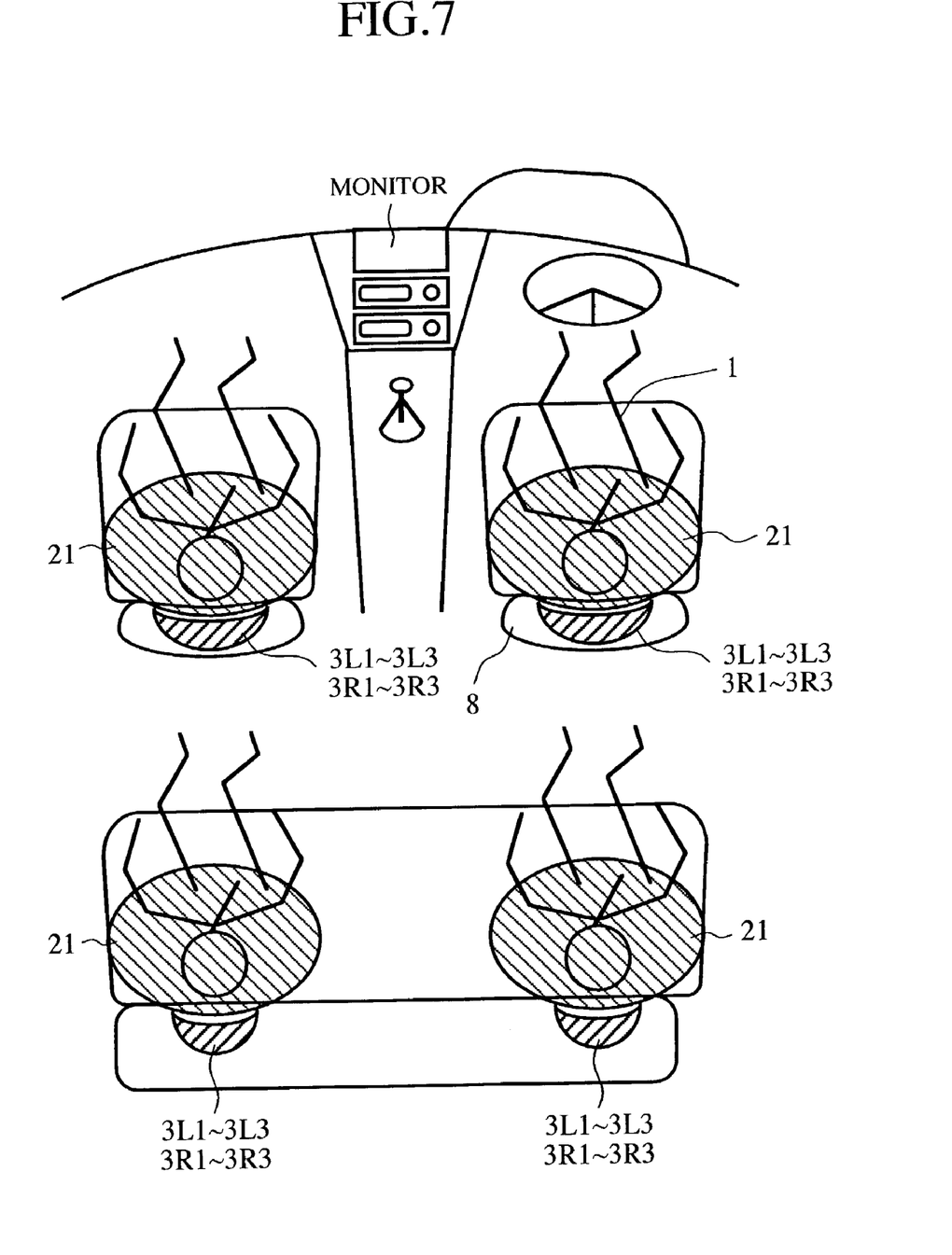
FIG. 7 is a plan view showing the three dimensional sound field reproducing space generated for each of the seats.

The reproducing space 21 of the three dimensional sound field is, as shown in FIG. 7, generated only around the head of the listener 1 who occupied each seat. Therefore, no influence is excised upon the three dimensional sound field reproducing unit of the other listeners 1 seated in the other seats. As a result, each of the listeners who are occupying the respective seats enjoys listening to the desired reproduced sound such as the AM broadcasting, the FM broadcasting, the CD-reproduced sound, the DVD-reproduced sound, or the like, without being influenced by the other reproduced sounds.

As described above, according to the first embodiment, it is possible for the listener seated in each of the seats to select the desired sound source and to reproduce a three dimensional sound field with rich presence. Further, the disposition of the speakers 3L1, 3L2, 3L3 and 3R1, 3R2, 3R3 that reproduce a three dimensional sound field 21 in the headrest 20 brings close to the positions of the external ears of the listener 1 to those of the speakers 3L1, 3L2, 3L3 and 3R1, 3R2, 3R3, so that an ideal three dimensional sound field can be realized.

SECOND EMBODIMENT

Figure 8:
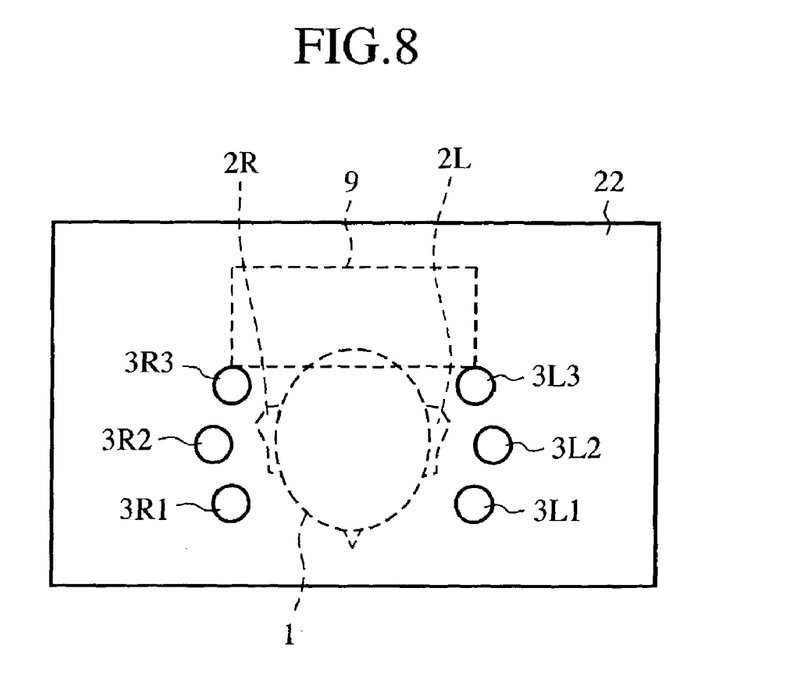
FIG. 8 is a plan view showing a state in which the speakers are disposed on a ceiling, which generates a three dimensional sound field reproducing space in a region inclusive of left and right external ears of a listener, for each of the seats to be occupied by respective listeners, in accordance with the left and right external ears of the listener so as to surround the head thereof.
Figure 9:
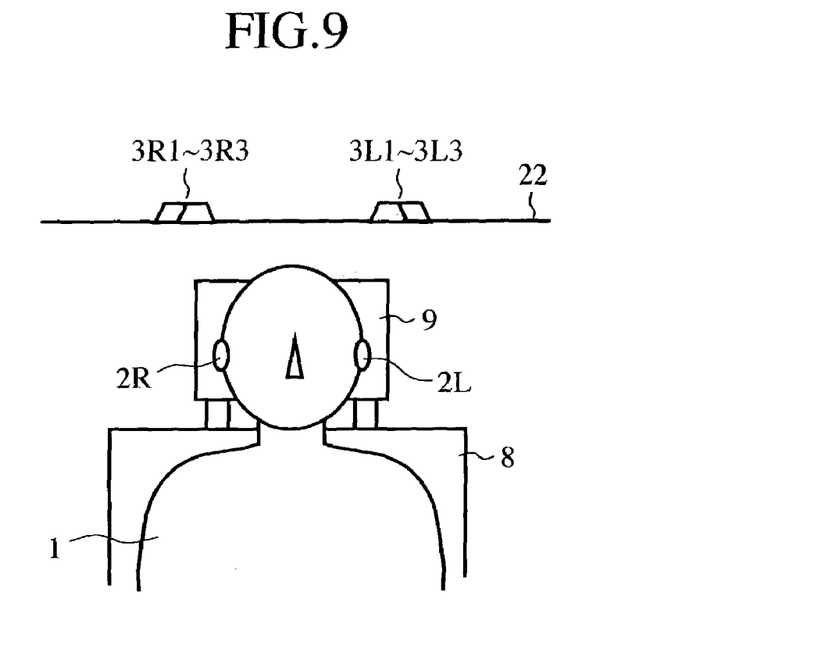
FIG. 9 is a front view of FIG. 9.

While in the first embodiment, the speakers 3L1, 3L2, 3L3 and 3R1, 3R2, 3R3 are disposed in the headrest 20, in the second embodiment, the speakers 3L1, 3L2, 3L3 and 3R1, 3R2, 3R3 are disposed on the ceiling 22 of the vehicle so as to surround the head of the listener 1. FIG. 8 shows a plan view of the second embodiment and FIG. 9 shows a front view of the same.

As described above, according to the second embodiment, since the speakers 3L1, 3L2, 3L3 and 3R1, 3R2, 3R3 are disposed on the ceiling 22 of the vehicle so as to surround the head of the listener 1, the distance of the speakers and the head is closed to one another and more freedom can be won in the position where the speakers are disposed as compared with the headrest 20.

THIRD EMBODIMENT

While in the second embodiment, the speakers 3L1, 3L2, 3L3 and 3R1, 3R2, 3R3 are disposed on the ceiling 11 of the vehicle, the crosstalk level between the left and right speakers 3L1, 3L2, 3L3 and 3R1, 3R2, 3R3 could be high. In order to solve it, according to the third embodiment, as shown in perspective view in FIG. 10, a partition plate 30 is provided between the speakers 3L1, 3L2, 3L3 and 3R1, 3R2, 3R3 disposed in the left and right.

Figure 10:
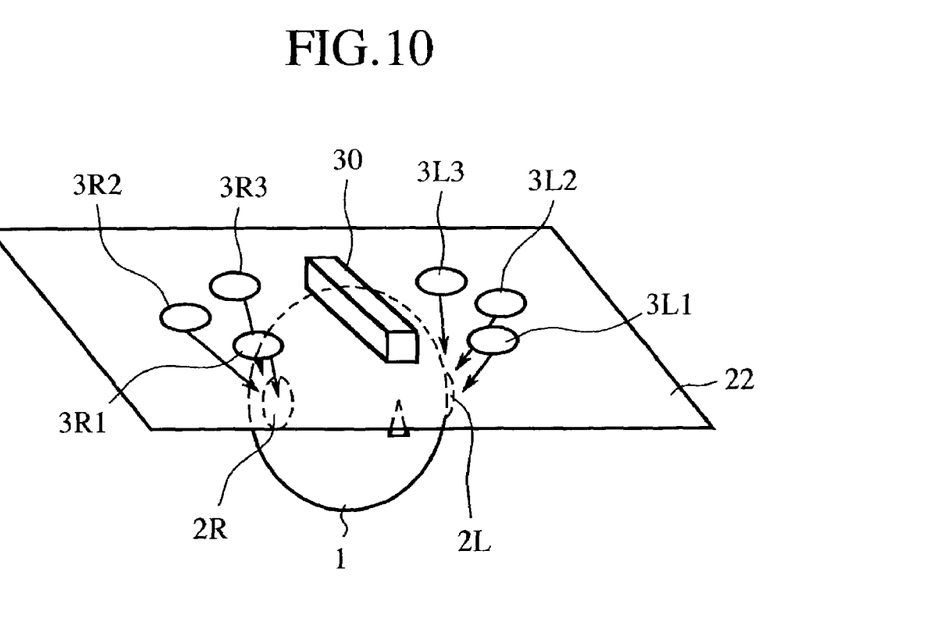
FIG. 10 is a perspective view in which a partition plate is disposed between the left and right speakers.

As described above, according to the third embodiment, the partition plate 30 allows reduction in crosstalk between the left and right speakers.

FOURTH EMBODIMENT

Figure 11:
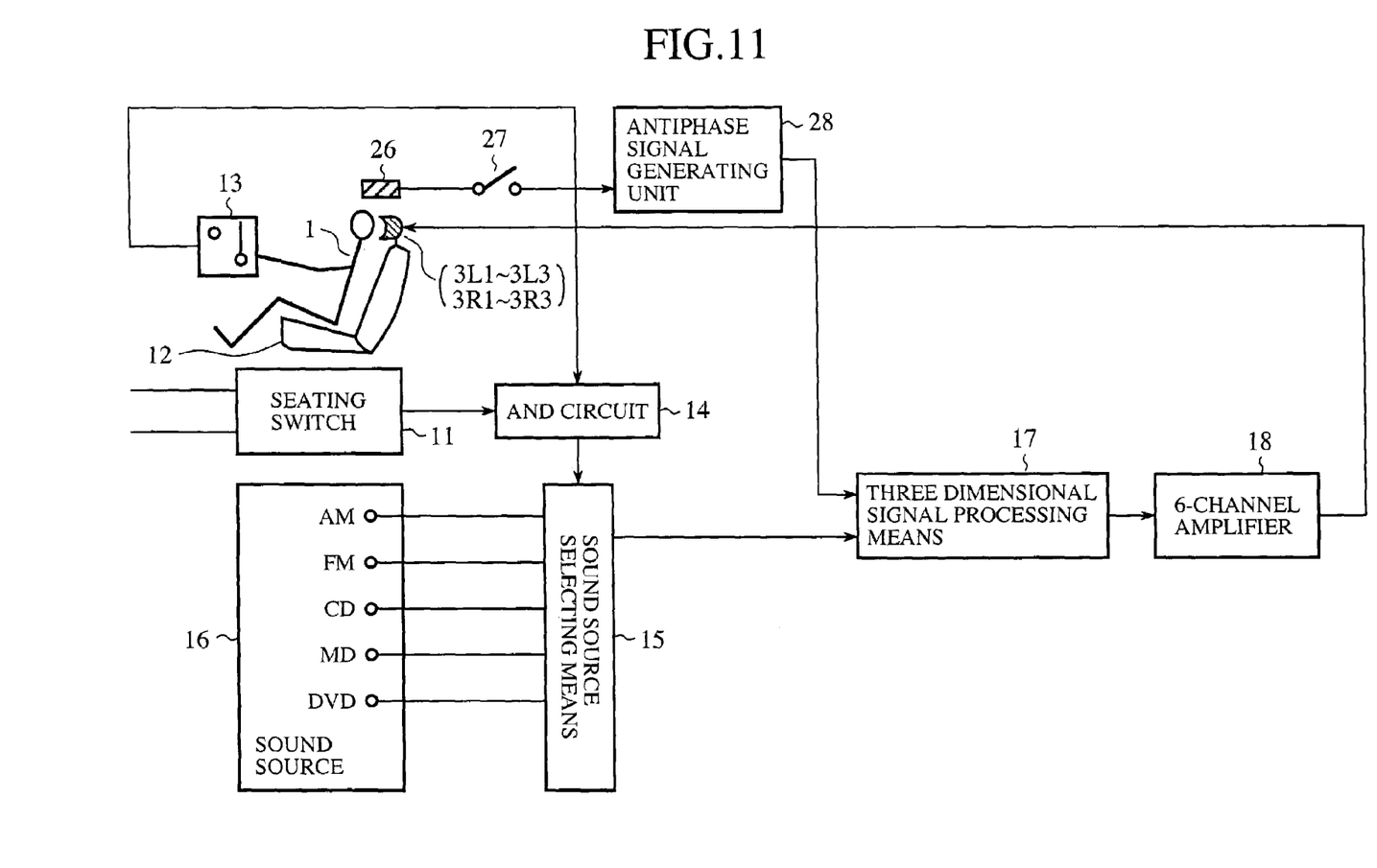
FIG. 11 is a block diagram showing an arrangement of a three dimensional sound field silencing unit according to this invention.

FIG. 11 is a block diagram showing an arrangement of the vehicle-mounted three dimensional sound field silencing unit according to this invention.

Referring to FIG. 11, reference numeral 26 denotes a volume detecting unit such as a microphone, or the like, which is provided so as to detect the volume in the region inclusive of the left and right external ears of the listener 1, 27 denotes a switch, and 28 denotes an antiphase signal generating unit (active noise canceller, ANC). Since the other structure of the third embodiment is the same as that of the first embodiment shown in FIG. 4, the same reference numerals indicate the same components, and therefore descriptions thereof are omitted for brevity s sake.

The operation of the vehicle-mounted three dimensional sound field silencing unit of the fourth embodiment will now be described.

When a listener 1 who wishes to spend a peaceful time inside the vehicle compartment closes the switch 27, a detected signal based on the volume in the three dimensional sound field reproducing space 21 (see FIG. 7) near the head detected by the volume detecting means 26 is inputted to the antiphase signal generating unit 28, and outputted after converting it into an antiphase signal. This antiphase signal cancels the vehicle noise (road noise, engine sound, or the like) detected by the volume detecting unit 26 to reduce the vehicle noise sound pressure near the listener to zero or to a small amount next to zero. As a result, it is possible to selectively perform a silencing operation in all of the seats without giving an adverse effect on the other listener 1.

As described above, according to the fourth embodiment, the sound can be silenced for respective seats depending on the wishes of the listeners without giving an adverse effect on the other seat or seats.

INDUSTRIAL APPLICABILITY

As described above, the three dimensional sound field reproducing•silencing unit according to this invention is qualified for reproducing a three dimensional sound field with rich presence for each of the seats and also to silence the sounds for each of the seats without giving an effect on the other seats.

The invention claimed is:

1. A three dimensional sound field reproducing unit comprising:
   a three dimensional sound field reproducing device for reproducing a three dimensional sound field;
   a plurality of listener sections, each section being occupied by a listener;
   a plurality of speakers, each speaker utilized by a single listener section, and wherein at least three or more of said plurality of speakers are disposed around a left external ear of each of said listener and at least three or more of said plurality of speakers are disposed around a right external ear of each of the listener so as to generate sound waves forming a three dimensional sound field reproducing space in a region inclusive of left and right external ears of each of the listeners; wherein said plurality of speakers are disposed in headrests of seats in the plurality of listening sections and wherein the plurality of speakers include at least three speakers being arranged in a vertical direction in a Y-Z plane near the left external ear and at least three speakers being arranged in a vertical direction in the Y-Z plane near the right external ear, wherein surfaces of the headrests are situated in the Y-Z plane;
   a switching unit for selecting one sound source from a plurality of sound sources; and
   a three dimensional signal processing unit for converting an output signal from a sound source selected by said switching unit into a three dimensional sound field signal for supplying it to each of said plurality of speakers.

2. A three dimensional sound field reproducing unit comprising:
   a three dimensional sound field reproducing device for reproducing a three dimensional sound filed;
   a plurality of listener sections, each section being occupied by a listener;
   a plurality of speakers, each speaker utilized by a single listener section, and wherein at least three or more of said plurality of speakers are disposed around a left external ear of each of said listener and at least three or more of said plurality of speakers are disposed around a right external ear of each of the listener so as to generate sound waves forming a three dimensional sound field reproducing space in a region inclusive of left and right external ears of each of the listeners; wherein said plurality of speakers are disposed in headrests of seats in the plurality of listening sections and wherein the plurality of speakers include at least three speakers being arranged in a vertical direction in a Y-Z plane near the left external ear and at least three speakers being arranged in a vertical direction in the Y-Z plane near the right external ear, wherein surfaces of the headrests are situated in the Y-Z plane;
   a sound source selecting unit for selecting one sound source from a plurality of sound sources;
   a switching unit for starting an operation of said sound source selecting unit; and
   a three dimensional signal processing unit for converting an output signal from the sound source into a three dimensional sound field signal for supplying it to each of said plurality of speakers;
   a volume detecting unit for detecting volume in the three dimensional sound field space; and
   an antiphase signal generator for supplying an antiphase signal that cancels noise based on the detected volume from said volume detecting unit to said three dimensional signal processing unit.

* * * * *